United States Patent
Yoo et al.

(10) Patent No.: US 11,845,533 B2
(45) Date of Patent: Dec. 19, 2023

(54) PROPELLER CONTROL SYSTEM OF AIR MOBILITY

(71) Applicants: Hyundai Motor Company, Seoul (KR); Kia Corporation, Seoul (KR)

(72) Inventors: Ji Woo Yoo, Incheon (KR); Keon Woo Kim, Gyeonggi-do (KR); Kwan Ho Moh, Gyeonggi-do (KR); Youn Sic Nam, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/699,877

(22) Filed: Mar. 21, 2022

(65) Prior Publication Data

US 2022/0402593 A1 Dec. 22, 2022

(30) Foreign Application Priority Data

Jun. 17, 2021 (KR) .................. 10-2021-0078965

(51) Int. Cl.
*B64C 11/00* (2006.01)
*B64C 11/28* (2006.01)
*B64D 27/24* (2006.01)

(52) U.S. Cl.
CPC ............ *B64C 11/003* (2013.01); *B64C 11/28* (2013.01); *B64D 27/24* (2013.01)

(58) Field of Classification Search
CPC ....... B64D 27/24; B64C 11/003; B64C 11/28; B64C 11/00; B64C 27/50; B64C 27/022; B64C 3/56
See application file for complete search history.

(56) References Cited

U.S. PATENT DOCUMENTS

| | | | | |
|---|---|---|---|---|
| 2,749,059 A | * | 6/1956 | Meyers | B64C 27/30 416/88 |
| 2,869,649 A | * | 1/1959 | Horst | B64C 27/50 416/88 |
| 6,568,906 B2 | * | 5/2003 | Gharibian | B64C 29/0033 384/42 |
| 6,655,915 B2 | * | 12/2003 | Gmirya | B64C 27/28 416/88 |
| 8,784,057 B2 | * | 7/2014 | Podgurski | B64C 27/46 416/142 |
| 9,108,727 B2 | * | 8/2015 | Hoover | B64C 27/50 |
| 10,711,791 B1 | * | 7/2020 | Rolling | F02K 3/062 |
| 2021/0403143 A1 | * | 12/2021 | Alley | B64C 11/28 |

FOREIGN PATENT DOCUMENTS

| | | |
|---|---|---|
| CN | 205311899 U | 6/2016 |
| CN | 111252237 A | 6/2020 |
| KR | 2020-0104582 A | 9/2020 |

* cited by examiner

*Primary Examiner* — Eldon T Brockman
*Assistant Examiner* — Andrew Thanh Bui
(74) *Attorney, Agent, or Firm* — Fox Rothschild LLP

(57) ABSTRACT

A propeller control system of an air mobility is configured to insert a movable part forming a propeller into a fixed part in a situation where the air mobility is stored and crashes, thereby reducing an entire length of the propeller. As a result, an entire size of the air mobility is reduced when the air mobility is stored, which may prevent secondary accidents caused by fragments generated by contact of the rotated propeller with the ground in the situation where the air mobility crashes.

13 Claims, 5 Drawing Sheets

PROPELLER CONTROL SYSTEM OF AIR MOBILITY

CROSS REFERENCE TO RELATED APPLICATION

The present application claims under 35 U.S.C. § 119(a) the benefit of Korean Patent Application No. 10-2021-0078965 filed Jun. 17, 2021, the entire contents of which are incorporated by reference herein.

BACKGROUND

(a) Technical Field

The present disclosure relates to a propeller control system of an air mobility, more particularly, to the propeller control system that can improve ease of storage by reducing a size of a propeller upon storing the air mobility, and is configured to prevent additional accidents caused by scattering of the propeller upon the occurrence of a crash of the air mobility.

(b) Description of the Related Art

Recently, an air mobility vehicle (or "air mobility") usable in various fields, such as a cargo container and medical transportation, has been under development, where energy efficiency and stabilization of the air mobility are being optimized, and the air mobility is approaching a stage of commercial use.

The air mobility flies by driving a propeller, and stability according to a crash situation of the air mobility is essentially required. Therefore, the air mobility selectively adjusts the driving of the propeller for avoiding a crash, but there is no safety countermeasure against a situation where the air mobility actually crashes.

For example, upon the crash of the air mobility, each rotated propeller hits the ground, and there is a problem in that fragments are generated as the quickly rotated propeller hits the ground, and fragments are scattered around, which may cause secondary accidents.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a propeller control system of an air mobility, which can improve ease of storage by reducing a size of a propeller when an air mobility is stored, and may prevent additional accidents caused by scattering of the propeller when the air mobility crashes.

A propeller control system of an air mobility according to the present disclosure for achieving the object includes a driving shaft connected to a driving motor to be rotated; a rotary shaft connected to the driving shaft via a first clutch to be rotated with the driving shaft according to whether the first clutch is engaged; a fixed part extending from the rotary shaft, having an internal space formed tin the fixed part, and forming a shape of part of a propeller; a movable part provided to be withdrawn from or inserted into the internal space of the fixed part, and forming a shape of the remainder of the propeller when withdrawn from the fixed part; a pulley mechanism connected to the driving shaft and connected to the movable part through the fixed part; and a control part configured to determine whether the movable part is inserted or withdrawn, and to control the first clutch to be disengaged when the movable part is inserted, such that the movable part connected to the pulley mechanism is inserted into the fixed part as the driving shaft and the pulley mechanism other than the rotary shaft are rotated by a driving motor.

The rotary shaft is rotatably installed on an air mobility, and inside the rotary shaft, so as to have the pulley mechanism rotatably installed on an upper side of the rotary shaft and to have the driving shaft connected to the pulley mechanism on a lower side of the rotary shaft.

The first clutch is composed of a first clutch plate provided on the rotary shaft, and a first friction plate moved by a first driving part installed on the driving shaft to be engaged or disengaged to the first clutch plate.

An elastomer configured to deliver a force in a direction in which the movable part is withdrawn is provided in the internal space of the fixed part.

The pulley mechanism includes a pulley part rotatably installed on the rotary shaft and connected to the driving shaft; and a wire part having one end connected to the pulley part and an opposite end connected to the movable part, and allowing the movable part to be inserted into the fixed part by being wound around the pulley part upon rotation of the pulley part.

The propeller control system of the air mobility further includes a brake installed on an air mobility, and contacting the rotary shaft according to whether the air mobility is operated to restrict the rotation of the rotary shaft.

The control part controls the brake to be operated when the movable part is inserted such that the rotation of the rotary shaft is restricted, and controls the first clutch to be disengaged such that the movable part is inserted into the fixed part by the pulley mechanism.

The driving shaft and the pulley mechanism are connected via a second clutch, and the driving shaft and the pulley mechanism are rotated together according to whether the second clutch is engaged.

The second clutch is composed of a second clutch plate provided in the pulley mechanism, and a second friction plate moved by a second driving part installed on the driving shaft to be engaged or disengaged to the second clutch plate.

The control part controls the second clutch to be engaged when the movable part is inserted such that the driving shaft and the pulley mechanism are rotated together.

The control part controls the first clutch to be engaged and the second clutch to be disengaged when the movable part is withdrawn in a state of being inserted such that the movable part is withdrawn by a centrifugal force generated by the rotation of the rotary shaft.

The control part receives a flight state of an air mobility, and controls the driving motor to be operated at a preset emergency speed when determining that the air mobility crashes such that the movable part is inserted.

The control part controls the driving motor to be operated at a preset storage speed when an air mobility is stored such that the movable part is inserted.

The fixed part is provided with a sensor part configured to confirm a position of the movable part, and the control part controls the driving motor not to be operated when receiving the fact that the movable part is completely inserted or withdrawn by the sensor part, when the movable part is inserted or withdrawn by the operation of the driving motor.

The propeller control system of the air mobility having the aforementioned configuration inserts the movable part forming the propeller into the fixed part in the situation where the air mobility is stored or crashes, thereby reducing the entire length of the propeller. As a result, the entire size of the air mobility is reduced when the air mobility is stored, thereby facilitating the storage, and preventing secondary accidents caused by fragments generated by the contact of the rotated propeller with the ground in the situation where the air mobility crashes.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit" "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a propeller control system of an air mobility according to a preferred exemplary embodiment of the present disclosure will be described with reference to the accompanying drawings.

Figure 1:
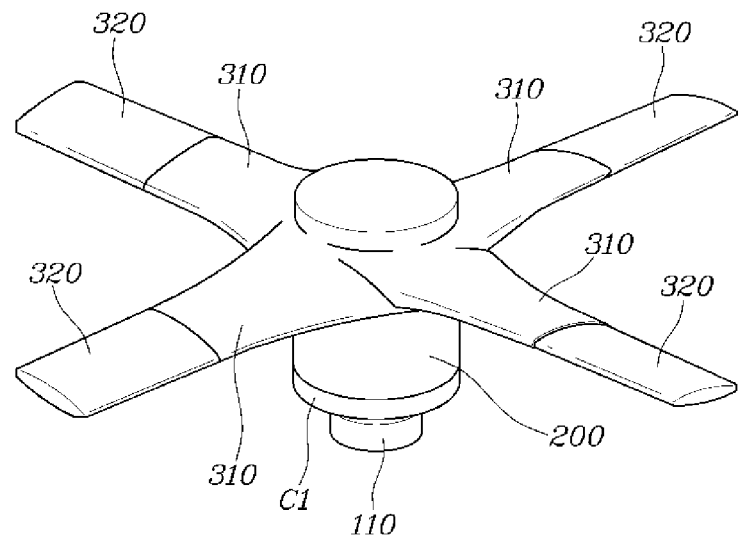
FIG. 1 is a diagram illustrating a propeller of an air mobility according to the present disclosure.
Figure 2:
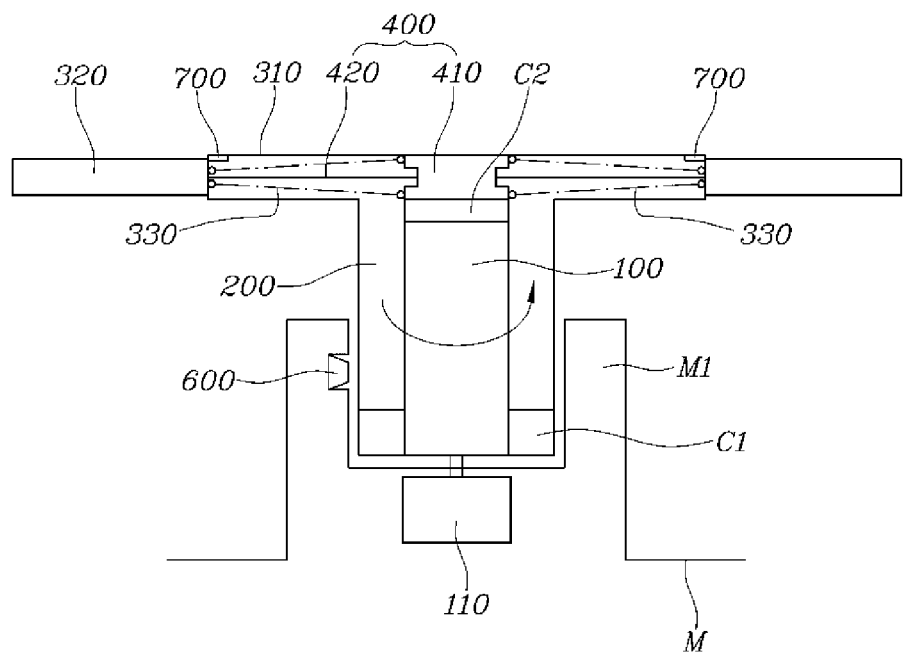
FIG. 2 is a cross-sectional diagram of the propeller of the air mobility illustrated in FIG. 1.
Figure 3:
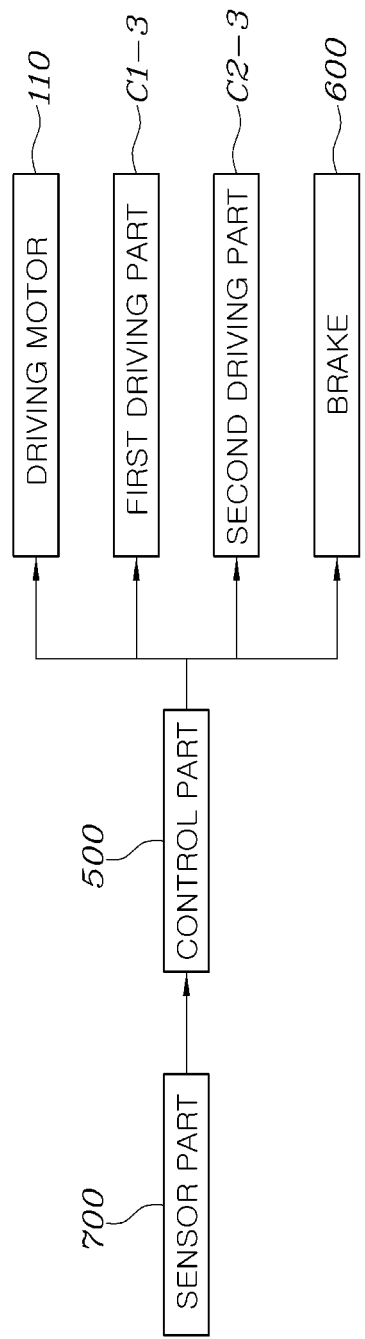
FIG. 3 is a diagram illustrating a configuration of a propeller control system of the air mobility according to the present disclosure.
Figure 4:
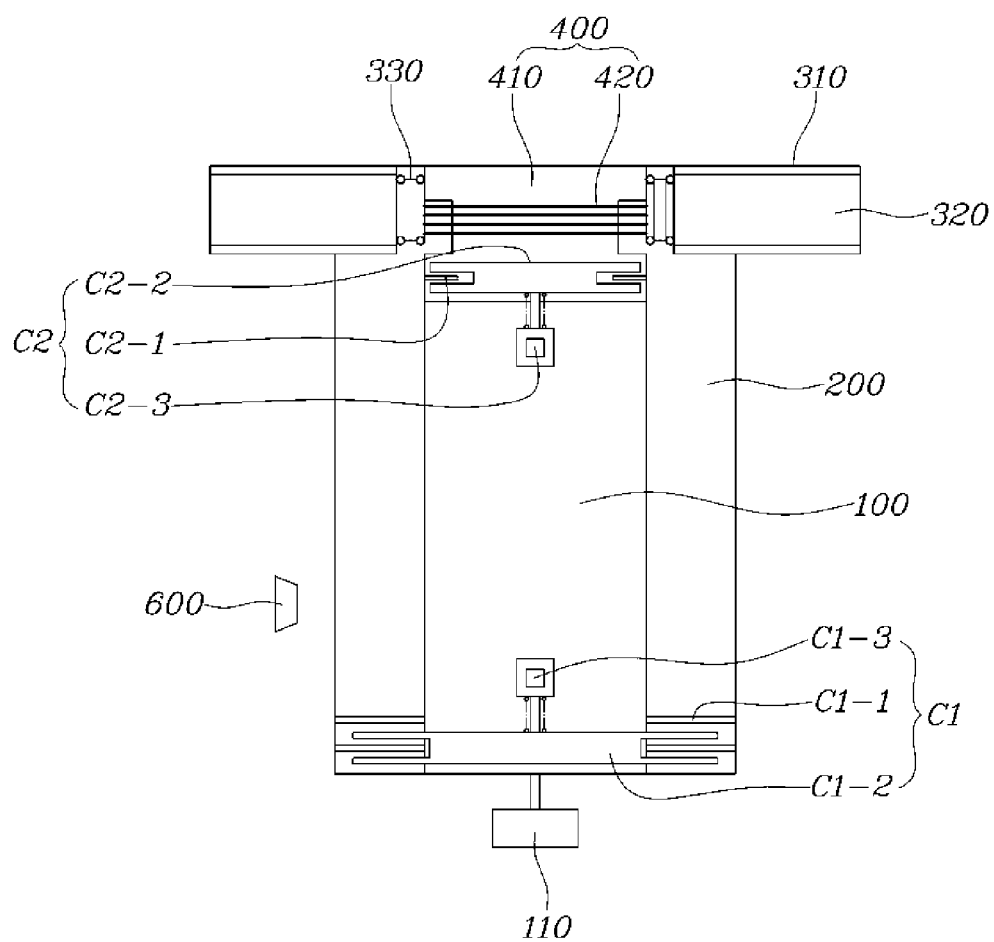
FIG. 4 is a diagram illustrating a first clutch and a second clutch according to the present disclosure.
Figure 5:
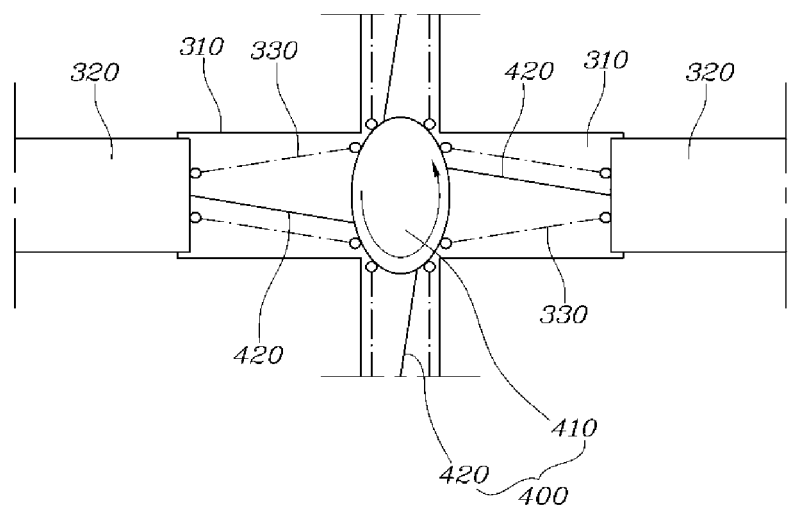
FIG. 5 is a diagram illustrating a pulley mechanism and an elastomer according to the present disclosure.
Figure 6:
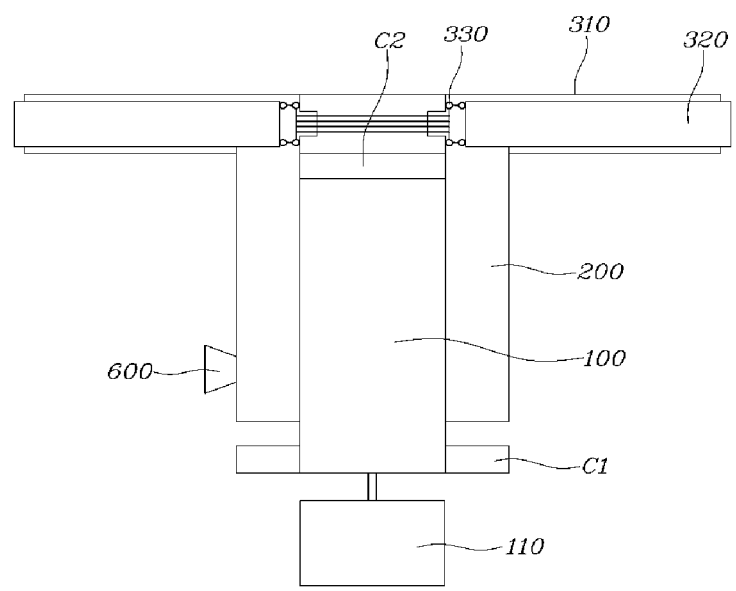
FIG. 6 is a diagram for explaining the insertion of a movable part.
Figure 7:
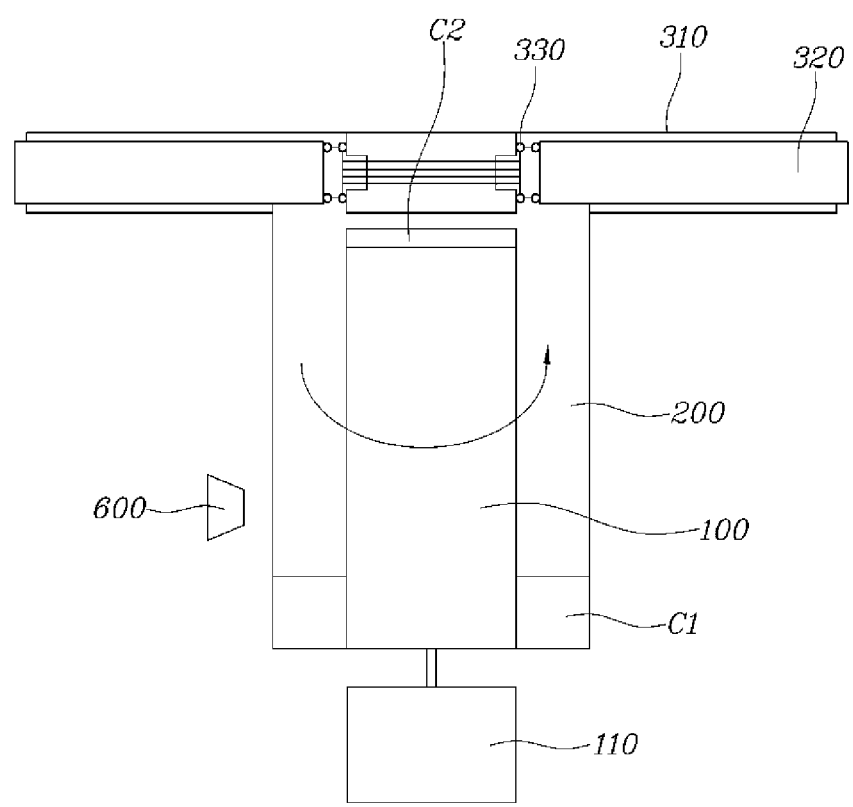
FIG. 7 is a diagram for explaining the withdrawal of the movable part in a state of being inserted.

FIG. 1 is a diagram illustrating a propeller of an air mobility according to the present disclosure, FIG. 2 is a cross-sectional diagram of the propeller of the air mobility illustrated in FIG. 1, FIG. 3 is a diagram illustrating a configuration of a propeller control system of the air mobility according to the present disclosure, FIG. 4 is a diagram illustrating a first clutch and a second clutch according to the present disclosure, FIG. 5 is a diagram illustrating a pulley mechanism and an elastomer according to the present disclosure, FIG. 6 is a diagram for explaining the insertion of a movable part, and FIG. 7 is a diagram for explaining the withdrawal of the movable part in a state of being inserted.

As illustrated in FIGS. 1 to 3, a propeller control system of an air mobility according to the present disclosure includes a driving shaft 100 connected to a driving motor 110 to be rotated; a rotary shaft 200 connected to the driving shaft 100 via a first clutch C1 to be rotated with the driving shaft 100 according to whether the first clutch C1 is engaged; a fixed part 310 extending from the rotary shaft 200, having an internal space formed in the fixed part 310, and forming a shape of part of a propeller; a movable part 320 provided to be withdrawn from or inserted into the internal space of the fixed part 310 and forming a shape of the remainder of the propeller when withdrawn from the fixed part 310; a pulley mechanism 400 connected to the driving shaft 100 and connected to the movable part 320 through the fixed part 310; and a control part 500 configured to determine whether the movable part 320 is inserted or withdrawn, and to control the first clutch C1 to be disengaged when the movable part 320 is inserted, such that the movable part 320 connected to the pulley mechanism 400 is inserted into the fixed part 310 as the driving shaft 100 and the pulley mechanism 400 other than the rotary shaft 200 are rotated by the driving motor 110.

The rotary shaft 200 is provided to be rotatably installed on an air mobility M, and inside the rotary shaft 200, so as to have the pulley mechanism 400 rotatably installed on an upper side of the rotary shaft 200 and to have the driving shaft 100 connected to the pulley mechanism 400 on a lower side of the rotary shaft 200. Here, the driving motor 110 connected to the driving shaft 100 may be installed on the air mobility M side.

The rotary shaft 200 may be installed on a main body or a wing of the air mobility M, and a mounting part M1 on which the rotary shaft 200 is inserted and mounted may be formed on the air mobility M. Further, the driving motor 110 connected to the driving shaft 100 may be installed on the air mobility M side.

In particular, the diving shaft 100 and the rotary shaft 200 are connected via the first clutch C1. As a result, the driving shaft 100 and the rotary shaft 200 are rotated together by the power of the driving motor 110 when the first clutch C1 is engaged, and only the driving shaft 100 may be rotated by the power of the driving motor 110 when the first clutch C1 is disengaged. An operation in which the movable part 320 is inserted or withdrawn according to the above operation will be described again below.

Meanwhile, the fixed part 310 extends from the rotary shaft 200, and the movable part 320 is configured to be inserted into or withdrawn from the fixed part 310. In other words, the outer appearances of the fixed part 310 and the movable part 320 form one propeller, and a thrust is generated by the rotation of the movable part 320 when the movable part 320 is withdrawn from the internal space of the fixed part 310. Further, the entire length of the propeller is reduced when the movable part 320 is inserted into the internal space of the fixed part 310.

Meanwhile, inside the rotary shaft 200, the pulley mechanism 400 is rotatably installed on the upper side of the rotary shaft 200, and the driving shaft 100 is connected to the pulley mechanism 400 on the lower side of the rotary shaft 200. In particular, the pulley mechanism 400 is connected to the movable part 320, such that the movable part 320 may be moved in the internal space of the fixed part 310 according to the rotation position as the pulley mechanism 400 is rotated with the driving shaft 100.

Therefore, the control part 500 determines whether the movable part 320 is inserted or withdrawn, and controls the first clutch C1 to be disengaged when the movable part 320 is inserted. As a result, the driving shaft 100 and the rotary shaft 200 are disconnected as the first clutch C1 is disengaged, such that the driving shaft 100 and the pulley mechanism 400 other than the rotary shaft 200 are rotated upon operation of the driving motor 110 and therefore, the movable part 320 connected to the pulley mechanism 400 is inserted into the fixed part 310.

As described above, the movable part 320 forming the propeller is inserted into the fixed part 310 in the situation where the air mobility M is stored or crashes, such that the entire length of the propeller is reduced. As a result, the entire size of the air mobility is reduced when the air mobility M is stored, thereby facilitating the storage, and preventing secondary accidents caused by fragments generated by the contact of the rotated propeller with the ground in the situation where the air mobility M crashes.

As illustrated in FIG. 4, the first clutch C1 is composed of a first clutch plate C1-1 provided on the rotary shaft 200, and a first friction plate C1-2 moved by a first driving part C1-3 installed on the driving shaft 100 to be engaged or disengaged to the first clutch plate C1-1.

Here, each of the first clutch plate C1-1 and the first friction plate C1-2 may be formed of multiple plates to secure operation performance.

The first clutch plate C1-1 is provided on an inside surface of the rotary shaft 200, and the first friction plate C1-2 is installed to be movable according to the driving shaft 100. In particular, the first friction plate C1-2 is selectively engaged or disengaged to the first clutch plate C1-1 as it is moved by the first driving part C1-3 installed on the driving shaft 100.

Here, as the first driving part C1-3, a motor, a hydraulic type, or a solenoid type may be applied, and the first driving part C1-3 may be formed of the solenoid for structural simplification.

Meanwhile, as illustrated in FIG. 2, an elastomer 330 configured to deliver a force in a direction in which the movable part 320 is withdrawn may be provided in the internal space of the fixed part 310.

The elastomer 330 may be formed of a spring, and forms an elastic force in a direction in which the movable part 320 is withdrawn from the fixed part 310. Further, the elastomer 330 may be formed of a tapered spring in a form of the diameter getting smaller in the longitudinal direction, thereby maximizing the reduction size when the movable part 320 is inserted.

As a result, the movable part 320 is maintained in a state of being withdrawn from the internal space of the fixed part 310 by the elastomer 330. Further, when the movable part 320 is withdrawn in the state of being inserted into the fixed part 310, the movable part 320 may be withdrawn by the elastic force of the elastomer 330.

Meanwhile, as illustrated in FIGS. 2 and 5, the pulley mechanism 400 includes a pulley part 410 rotatably installed on the rotary shaft 200 and connected to the driving shaft 100; and a wire part 420 having one end connected to the pulley part 410 and an opposite end connected to the movable part 320, and allowing the movable part 320 to be inserted into the fixed part 310 by being wound around the pulley part 410 upon rotation of the pulley part 410.

As described above, the pulley mechanism 400 is composed of the pulley part 410 and the wire part 420.

In particular, the pulley part 410 is rotatably installed on the rotary shaft 200 on the upper side of the rotary shaft 200, and connected to the driving shaft 100 on the lower side of the rotary shaft 200.

As a result, if the first clutch C1 is engaged to connect the driving shaft 100 to the rotary shaft 200, the pulley part 410 is also rotated at the same rotating force as the driving shaft 100 and the rotary shaft 200 are rotated together.

Here, if the first clutch C1 is disengaged to disconnect the driving shaft 100 and the rotary shaft 200, the pulley part 410 is rotated with the driving shaft 100 in the rotary shaft 200 as the driving shaft 100 other than the rotary shaft 200 is rotated by the driving motor 110.

As described above, as the rotating speeds of the pulley part 410 and the rotary shaft 200 are different, the wire part 420 connected to the pulley part 410 performs a winding operation, and the movable part 320 may perform an operation of being inserted into the fixed part 310 by the winding of the wire part 420.

In other words, the wire part 420 has one end connected to the pulley part 410 and an opposite end connected to the movable part 320, such that the movable part 320 is inserted into the fixed part 310 by pulling the movable part 320 as the wire part 420 is wound around the pulley part 410 upon rotation of the pulley part 410.

As a result, the movable part 320 may perform the insertion operation by the pulley mechanism 400.

Meanwhile, the air mobility M further includes a brake 600 installed on the air mobility M and contacting the rotary shaft 200 according to whether the air mobility M is operated to restrict the rotation of the rotary shaft 200.

The brake 600 is configured to be operated by a control of the control part 500, and to selectively contact an outer surface of the rotary shaft 200 by the control of the control part 500 in a state of being installed on the air mobility M.

Here, the brake 600 may be installed on the mounting part M1 on which the rotary shaft 200 is inserted and mounted in the air mobility M, and may restrict the rotation of the rotary shaft 200 through friction Therefore, the control part 500 controls the brake 600 to be operated when the movable part 320 is inserted such that the rotation of the rotary shaft 200 is restricted, and controls the first clutch C1 to be disengaged such that the movable part 320 is inserted into the fixed part 310 by the pulley mechanism 400.

In other words, the control part 500 controls the first clutch C1 to be disengaged when the movable part 320 is inserted such that the driving shaft 100 and the pulley mechanism 400 other than the rotary shaft 200 are rotated by the driving motor 110. At this time, if the rotary shaft 200 is freely rotated, the insertion operation of the movable part 320 may not be normally performed even if the pulley mechanism 400 is rotated. As an example, since the rotary shaft 200 is in the state of being rotated during flight, the rotation of the pulley mechanism 400 may be absorbed by the rotation of the rotary shaft 200.

Therefore, the control part 500 controls the brake 600 when the movable part 320 is inserted such that the rotation of the rotary shaft 200 is restricted, and controls the first clutch C1 to be disengaged such that the insertion operation of the movable part 320 is nominally performed by the pulley mechanism 400 as the driving shaft 100 and the pulley mechanism 400 other than the rotary shaft 200 are rotated by the driving motor 110.

Meanwhile, as illustrated in FIG. 4, the driving shaft 100 and the pulley mechanism 400 are connected via a second clutch C2, and the driving shaft 100 and the pulley mechanism 400 may be rotated together according to whether the second clutch C2 is engaged.

The second clutch C2 is configured for the withdrawal operation of the movable part 320, and engaged such that the driving shaft 100 and the pulley mechanism 400 are rotated together usually and when the movable part 320 is inserted, and disengaged such that the driving shaft 100 and the pulley mechanism 400 are individually rotated when the movable part 320 is withdrawn.

In particular, the second clutch C2 is composed of a second clutch plate C2-1 provided in the pulley mechanism 400, and a second friction plate C2-2 moved by a second driving part C2-3 installed on the driving shaft 100 to be engaged or disengaged to the second clutch plate C2-1.

Here, each of the second clutch plate C2-1 and the second friction plate C2-2 may be formed of multiple plates to secure operation performance.

The second clutch plate C2-1 is provided in the pulley part 410 of the pulley mechanism 400, and the second friction plate C2-2 is movably installed. In particular, as the second friction plate C2-2 is moved by the second driving pat C2-3 installed on the driving shaft 100, the second friction plate C2-2 is selectively engaged or disengaged to the second clutch plate C2-1.

Here, as the second driving part C2-3, a motor, a hydraulic type, or a solenoid type may be applied, and the second driving part C2-3 may be formed of the solenoid for structural simplification.

Therefore, the control part 500 controls the second clutch C2 to be engaged when the movable part 320 is inserted such that the driving shaft 100 and the pulley mechanism 400 are rotated together.

In other words, the control part 500 controls the second clutch C2 to be engaged when the movable part 320 is inserted, and controls the first clutch C1 to be disengaged such that the diving shaft 100 and the pulley mechanism 400 other than the rotary shaft 200 are rotated by the driving motor 110. Therefore, the movable part 320 may be inserted by the rotation of the pulley mechanism 400.

Here, the control part 500 usually controls the first clutch C1 and the second clutch C2 to be engaged such that all of the driving shaft 100, the rotary shaft 200, and the pulley mechanism 400 are simultaneously rotated by the driving motor 110 to enable the normal flight.

Meanwhile, the control part 500 controls the first clutch C1 to be engaged and the second clutch C2 to be disengaged when the movable part 320 is withdrawn in the state of being inserted, such that the movable part 320 is withdrawn by a centrifugal force generated by the rotation of the rotary shaft 200.

In other words, when the movable part 320 is withdrawn, the driving shaft 100 and the rotary shaft 200 are rotated together by the driving motor 110 as the first clutch C1 is engaged, and the pulley mechanism 400 is freely rotated as the second clutch C2 is disengaged.

As a result, in the state where the movable part 320 is inserted into the fixed part 310, as the first clutch C1 is engaged and the second clutch C2 is disengaged and therefore, the pulley mechanism 400 is freely rotated, the movable part 320 may be withdrawn by the centrifugal force generated by the rotation of the rotary shaft 200. Further, the movable part 320 may also be withdrawn by the elastic force of the elastomer 330 provided on the fixed part 310 as the pulley mechanism 400 is freely rotated.

Meanwhile, the control part 500 receives a flight state of the air mobility M, and controls the driving motor 110 to be operated at a preset emergency speed when determining that the air mobility M crashes, such that the movable part 320 may be inserted.

In other words, the control part 500 may determine whether the air mobility M crashes according to a falling speed of the air mobility M, posture information of the air mobility M, or the like, and if it is determined that the air mobility M crashes, the control part 500 controls the driving motor 110 to be operated at the preset emergency speed in the state where the first clutch C1 is disengaged.

As a result, the movable part 320 may be inserted into the fixed part 310 by the rotation of the pulley mechanism 400 as the driving shaft 100 and the pulley mechanism 400 other than the rotary shaft 200 are rotated by the driving motor 110.

In particular, since the quick insertion operation of the movable part 320 should be performed in the situation where the air mobility M crashes, the control part 500 controls the driving motor 110 to be operated at the preset emergency speed. Therefore, the insertion operation of the movable part 320 may be quickly performed.

Here, the preset emergency speed in the control part 500 may be set such that the movable part 320 may be quickly inserted into the fixed part 310 by the operation of the driving motor 110, and corrected according to the falling speed of the air mobility M and the posture of the air mobility M.

Meanwhile, the control part 500 controls the driving motor 110 to be operated at a preset storage speed when the air mobility M is stored such that the movable part 320 is inserted.

In other words, the control part 500 may determine whether the air mobility M is stored according to information according to a user's operation or the storage movement of the air mobility M, and controls the driving motor 110 to be operated at the preset storage speed in the state where the first clutch C1 is disengaged when the air mobility M is stored.

As a result, the movable part 320 may be inserted into the fixed part 310 by the rotation of the pulley mechanism 400 as the driving shaft 100 and the pulley mechanism 400 other than the rotary shaft 200 are rotated by the driving motor 110.

In particular, since the insertion operation of the movable part 320 should be stably performed by minimizing damages between the components rather than inserting the movable part 320 at an unreasonable speed in the situation where the air mobility M is stored, the driving motor 110 is operated at the preset storage speed.

Meanwhile, a sensor part 700 configured to confirm the position of the movable part 320 is provided in the fixed part 310, and the control part 500 controls the driving motor 110 not to be operated when receiving the fact that the movable part 320 is completely inserted or withdrawn by the sensor part 700 upon insertion or withdrawal of the movable part 320 by the operation of the driving motor 110.

The sensor part 700 may be formed of a Hall sensor or a position sensor, and confirm the movement position of the movable part 320.

Therefore, when the movable part 320 is inserted or withdrawn by the operation of the driving motor 110, the control part 500 confirms the position of the movable part 320 by the sensor part 700, and controls the driving motor 110 not to be operated when receiving the fact that the movable part 320 is completely inserted or withdrawn, thereby preventing damages between the components due to the excessive movement of the movable part 320.

The aforementioned insertion or withdrawal operation of the movable part 320 according to the present disclosure may be performed as follows.

As illustrated in FIG. 2, in the initial state where the movable part 320 is withdrawn from the fixed part 310, the first clutch C1 and the second clutch C2 are engaged, and the brake 600 is not operated.

Therefore, upon operation of the driving motor 110, the driving shaft 100, the rotary shaft 200, and the pulley mechanism 400 are rotated together, and as the movable part 320 maintains the state of being withdrawn from the fixed part 310, the thrust is generated by the rotation of the propeller formed by the movable part 320 and the fixed part 310.

Meanwhile, if the movable part 320 is required to be inserted, as illustrated in FIG. 6, the first clutch C1 is disengaged and the second clutch C2 is engaged and therefore, the driving shaft 100 and the pulley mechanism 400 other than the rotary shaft 200 are rotated upon operation of the driving motor 110. Further, as the brake 600 is operated, the rotation of the rotary shaft 200 is restricted.

As a result, the pulley mechanism 400 is rotated with the driving shaft 100 other than the rotary shaft 200 by the operation of the driving motor 110, such that the movable part 320 is moved into the fixed part 310.

Therefore, the movable part 320 is inserted into the fixed part 310, and at this time, the elastomer 330 is maintained in a pressurized state.

Meanwhile, as illustrated in FIG. 7, if the movable part 320 is required to be withdrawn in the state of being inserted, the first clutch C1 is engaged, the second clutch C2 is disengaged, and the brake 600 is not operated.

Therefore, upon operation of the driving motor 110, the driving shaft 100 and the rotary shaft 200 are rotated together and the pulley mechanism 400 is freely rotated. Therefore, the movable part 320 may be withdrawn from the fixed part 310 by the centrifugal force generated by the rotation of the rotary shaft 200 and the elastic force of the elastomer 330.

The propeller control system of the air mobility M having the aforementioned configuration inserts the movable part 320 forming the propeller into the fixed part 310 in the situation where the air mobility M is stored and crashes, thereby reducing the entire length of the propeller. As a result, the entire size of the air mobility is reduced when the air mobility M is stored, thereby facilitating the storage, and preventing secondary accidents caused by fragments generated by the contact of the rotated propeller with the ground in the situation where the air mobility M crashes.

While the specific exemplary embodiment of the present disclosure has been illustrated and described, it will be apparent to those skilled in the art that the present disclosure may be variously improved and changed without departing from the technical spirit of the present disclosure provided by the appended claims.

What is claimed is:

1. A propeller control system of an air mobility, the propeller control system comprising:
    a driving shaft connected to a driving motor to be rotated;
    a rotary shaft connected to the driving shaft via a first clutch to be rotated with the driving shaft according to whether the first clutch is engaged;
    a fixed part extending from the rotary shaft, having an internal space formed in the fixed part, and forming a shape of part of a propeller;
    a movable part provided to be withdrawn from or inserted into the internal space of the fixed part, and forming a shape of the remainder of the propeller when withdrawn from the fixed part;
    a pulley mechanism connected to the driving shaft and connected to the movable part through the fixed part; and
    a control part configured to determine whether the movable part is inserted or withdrawn, and to control the first clutch to be disengaged when the movable part is inserted, such that the movable part connected to the pulley mechanism is inserted into the fixed part as the driving shaft and the pulley mechanism other than the rotary shaft are rotated by the driving motor,
    wherein the driving shaft and the pulley mechanism are connected via a second clutch, and the driving shaft and the pulley mechanism are rotated together according to whether the second clutch is engaged.

2. The propeller control system of the air mobility according to claim 1, wherein the rotary shaft is rotatably installed on the air mobility, and the pulley mechanism is disposed inside the rotary shaft, so as to have the pulley mechanism rotatably installed on an upper side of the rotary shaft and to have the driving shaft connected to the pulley mechanism on a lower side of the rotary shaft.

3. The propeller control system of the air mobility according to claim 1, wherein the first clutch is composed of a first clutch plate provided on the rotary shaft, and a first friction plate moved by a first driving part installed on the driving shaft to be engaged or disengaged to the first clutch plate.

4. The propeller control system of the air mobility according to claim 1, wherein an elastomer configured to deliver a force in a direction in which the movable part is withdrawn is provided in the internal space of the fixed part.

5. The propeller control system of the air mobility according to claim 1, wherein the pulley mechanism comprises:
    a pulley part rotatably installed on the rotary shaft and connected to the driving shaft; and
    a wire part having one end connected to the pulley part and an opposite end connected to the movable part, and allowing the movable part to be inserted into the fixed part by being wound around the pulley part upon rotation of the pulley part.

6. The propeller control system of the air mobility according to claim 1, further comprising:
a brake installed on the air mobility, and contacting the rotary shaft according to whether the air mobility is operated to restrict the rotation of the rotary shaft.

7. The propeller control system of the air mobility according to claim 6, wherein the control part controls the brake to be operated when the movable part is inserted such that the rotation of the rotary shaft is restricted, and controls the first clutch to be disengaged such that the movable part is inserted into the fixed part by the pulley mechanism.

8. The propeller control system of the air mobility according to claim 1, wherein the second clutch is composed of a second clutch plate provided in the pulley mechanism, and a second friction plate moved by a second driving part installed on the driving shaft to be engaged or disengaged to the second clutch plate.

9. The propeller control system of the air mobility according to claim 1, wherein the control part controls the second clutch to be engaged when the movable part is inserted such that the driving shaft and the pulley mechanism are rotated together.

10. The propeller control system of the air mobility according to claim 1, wherein the control part controls the first clutch to be engaged and the second clutch to be disengaged when the movable part is withdrawn in a state of being inserted such that the movable part is withdrawn by a centrifugal force generated by the rotation of the rotary shaft.

11. The propeller control system of the air mobility according to claim 1, wherein the control part receives a flight state of the air mobility, and controls the driving motor to be operated at a preset emergency speed when determining that the air mobility crashes such that the movable part is inserted.

12. The propeller control system of the air mobility according to claim 1, wherein the control part controls the driving motor to be operated at a preset storage speed when the air mobility is stored such that the movable part is inserted.

13. The propeller control system of the air mobility according to claim 1,
wherein the fixed part is provided with a sensor part configured to confirm a position of the movable part, and
wherein the control part controls the driving motor not to be operated when receiving the fact that the movable part is completely inserted or withdrawn by the sensor part, when the movable part is inserted or withdrawn by the operation of the driving motor.

* * * * *